Aug. 11, 1953     L. REEVE     2,648,600
CONCENTRATION OF IRON ORE
Filed Jan. 11, 1950     2 Sheets-Sheet 1
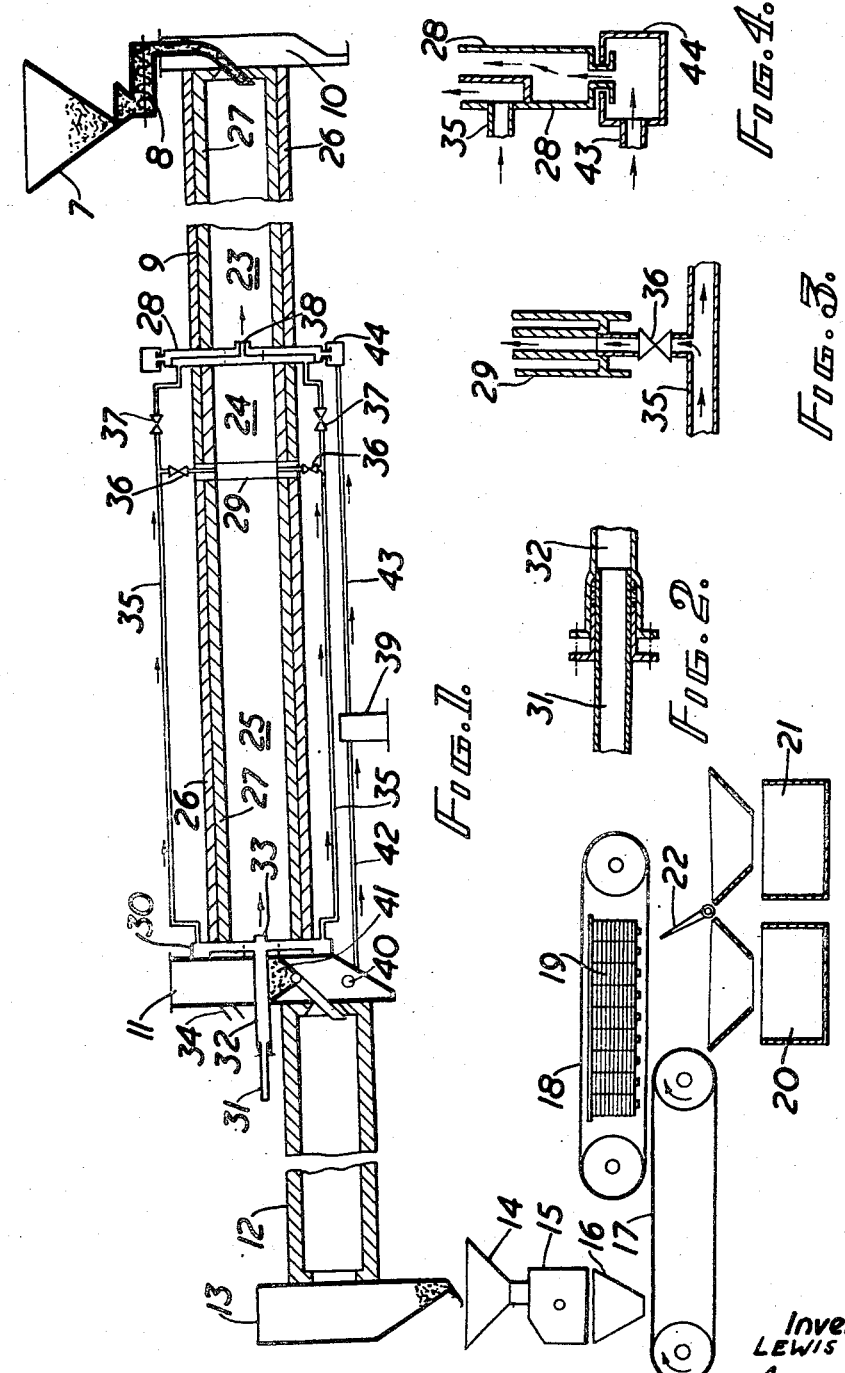
Inventor
LEWIS REEVE
By *Frederick E. Hary*
Attorney

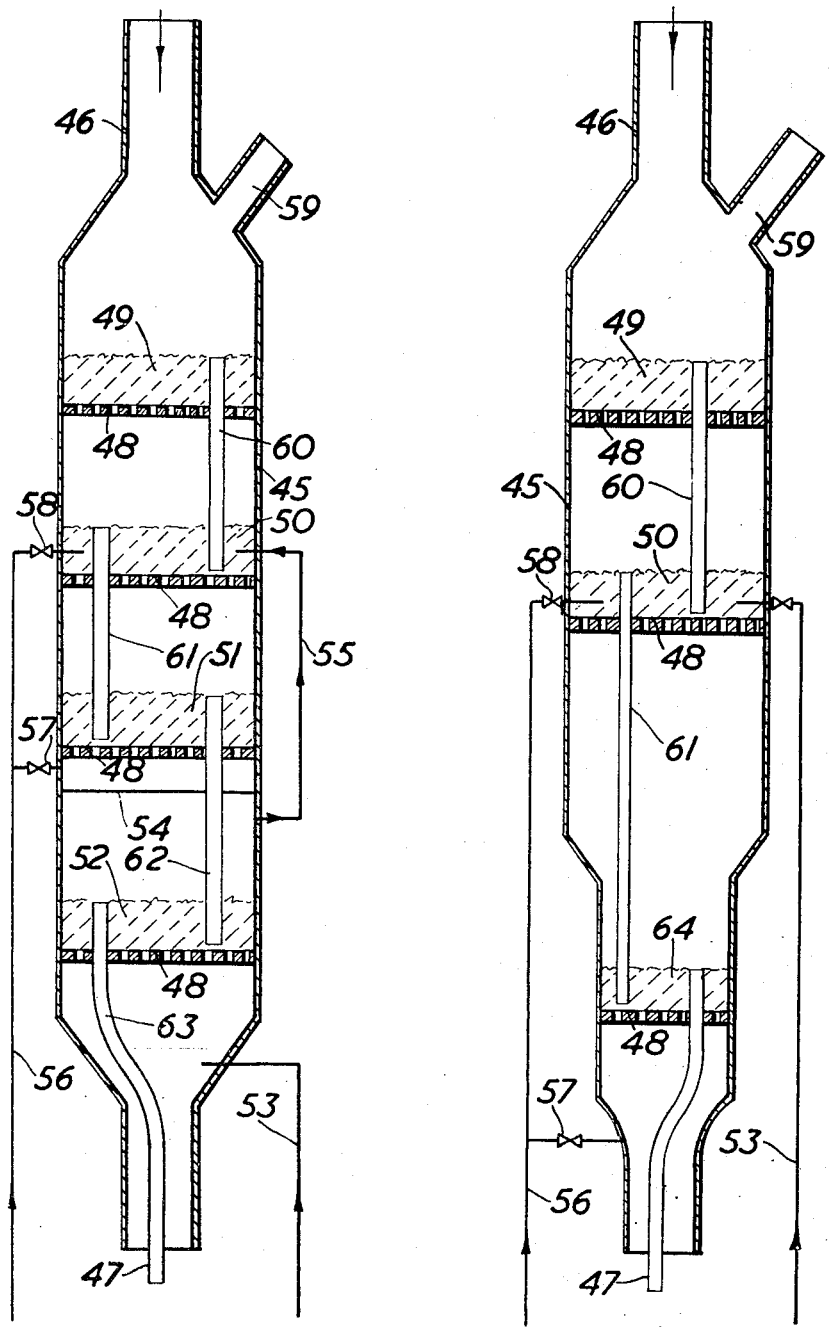

Patented Aug. 11, 1953

2,648,600

UNITED STATES PATENT OFFICE 2,648,600

CONCENTRATION OF IRON ORE

Lewis Reeve, Sheffield, England, assignor to The United Steel Companies, Limited, Sheffield, England, a British company Application January 11, 1950, Serial No. 137,986
In Great Britain November 19, 1948

5 Claims. (Cl. 75—1)

This invention relates to the concentration of iron ore by the magnetic method. This method consists essentially in heating the crude ore in a slightly reducing atmosphere to convert the sesquioxide ($Fe_2O_3$) to ferrosoferric oxide ($Fe_3O_4$) and then cooling either in gas or in air, the product being subsequently divided magnetically into a concentrate relatively enriched in percentage of iron and which contains the greater part of the iron and tailings which contain only a small proportion of the iron. It is known that when the cooling of the ore after roasting is carried out in air the temperature at which the ore is reoxidized must be kept below a limiting value, which has been variously stated in the literature, in order that the sesquioxide in the product shall be in the magnetic $\gamma$ form and not in the ordinary non-magnetic $\alpha$ form. In our experiments we have found that the reoxidation temperature may be as high as 700° C. for short periods (up to 10 minutes) without causing serious loss of iron and that for the magnetic reduction temperatures between 400° C. and 1050° C. are suitable, the range from 500° C. to 750° C. being preferred. When cooling is carried out in gas, no reoxidation takes place and the ore is recovered as ferrosoferric oxide.

In accordance with the present invention iron ore containing lime in the form of the carbonate ($CaCO_3$) which is to be magnetically concentrated in the manner outlined above is first roasted in an oxidizing atmosphere at a substantially higher temperature than that required for the magnetic roast in order to produce free lime (CaO), and then subjected to a slightly reducing magnetic roast at a lower temperature. The oxidizing roast should be effected at a temperature above about 900° C. in order to secure adequate calcination and below about 1050° C. in order to prevent combination of the lime with the iron. The magnetic roast is carried out at temperatures already described in the first paragraph viz. between 500 and 750° C. The lime present in the ore largely passes into the tailings from the magnetic separating plant and its conversion to free lime in accordance with the present invention greatly increases the value of these tailings, which may be used for agricultural or chemical purposes. An additional advantage is that an appreciable percentage of the sulphur present in the iron ore is absorbed by the free lime and consequently passes largely to the tailings. The proportion of sulphur to iron in the concentrate from the magnetic separation is thus substantially less than in the crude ore, the reduction in some cases being as much as 75%. The invention is particularly suitable for use in the treatment of naturally occurring limey iron ores, but in suitable cases lime in either free or combined form may be added to the crude ore in order to obtain or enhance the effects indicated.

The process of the invention may be carried into practice in a variety of ways and with a variety of forms of apparatus, some of which are shown in the accompanying drawings. In these drawings, Figure 1 represents one form of the apparatus, the rotary kiln in which the double roast of the ore is effected being shown in axial section; Figures 2, 3 and 4 show on an enlarged scale details of the apparatus of Figure 1; Figure 5 shows an alternative form of apparatus for effecting the double roast of the ore and Figure 6 shows a modification of the apparatus of Figure 5.

Referring first to Figures 1 to 4, raw limey iron ore, preferably crushed to below ¾ inch in size is supplied to a hopper 7, from which it is delivered by a worm feed 8 to the upper end of a cylindrical kiln 9. The kiln is disposed with its axis inclined at a small angle to the horizontal and is mounted for rotation about that axis between stationary end members 10, 11. After travelling through the length of the kiln 9, the ore flows into the upper end of a smaller cooling kiln 12, which is similarly disposed with its axis inclined at a small angle to the horizontal and mounted for rotation about that axis between stationary end members 11, 13. The ore leaving the lower end of the cooling kiln is discharged through the end member 13 into the supply hopper 14 of a hammer mill 15, in which it is crushed to minus 12 mesh (0.055 inch) and preferably mainly below 22 mesh (0.0275 inch). The finely divided ore from the mill passes to a magnetic separator, which may be of any suitable construction. As here shown, the ore from the mill is directed by a hopper 16 onto the upper reach of an endless conveyor belt 17, which carries it beneath the lower reach of a second endless conveyor belt 18. Magnets 19 attract the magnetic material in the ore and hold it against the underside of the belt 18, while the non-magnetic tailings remain on the lower belt and are discharged into the tailings bin 20. The magnetic material drops off the upper belt 18 after passing the last of the magnets and is received in a concentrate bin 21. An adjustable gate 22 divides the concentrate from the tailings.

The kiln 9 is composed of three aligned sections 23, 24, 25, each comprising a steel shell 26 and a brick lining 27, and three rings 28, 29, 30 respectively located at the lower ends of the three sections. Fuel gas for the kiln is supplied through a stationary pipe 31 disposed on the axis of the kiln beyond the lower end thereof. The preferred gas is blast furnace gas, but other gases, including coke oven and producer gas may be used, though they are preferably first treated to remove the greater part of their sulphur content. The pipe 31 is connected by means of a gas tight rotary seal, the construction of which is shown in Figure 2, to an aligned pipe 32 which rotates with the kiln and is carried by the ring 30. A controlled quantity of the gas entering the kiln through pipe 32 is consumed at the reducing burner 33 carried by ring 30, the air for this burner being drawn in from the outside atmosphere through adjustable louvres 34 in the end member 11. The greater part of the gas, however, passes to the pipes 35, which rotate with the kiln and extend outside the steel shell from the ring 30 to the ring 28 and have branches leading to the cooling ring 29, whose construction is shown in Figure 3. Valves 36, 37 control the relative amounts of the gas flowing through the pipes 35 which enters the kiln through the cooling ring 29 and which passes through ring 28 to the oxidizing burner 38 carried by that ring. The excess air required for the oxidizing burner is supplied by a pump 39 which draws in air from the outside atmosphere through the stationary end member 13 at the lower end of the cooling kiln 12. The air flows through the length of this kiln, cooling the ore and being heated by it, to an exit passage 40 in the end member 11. The ore passage 41 through the end member 11 is so shaped that it is sealed by the ore flowing through it from kiln 9 to kiln 12, thereby preventing the air from kiln 12 from entering the lower end of kiln 9. The air flows from passage 40 through a stationary pipe 42 to the pump 39 and thence through pipe 43, to a stationary annular sealing box 44, through which (as best shown in Figure 4) it flows into the ring 28 and is delivered to an annular outlet surrounding the oxidizing burner 38.

The raw limey ore entering the upper end of kiln 9 first travels through the length of the section 23 and is there heated under oxidizing conditions to a temperature somewhat in excess of 900° C., thereby converting the combined lime to free lime. The ore now travels through ring 28 into the second section 24 of the kiln passing through the annular gap between the oxidizing burner 38 and the walls of the kiln. To assist the movement of the ore through this gap, vanes set at an angle of about 45° to the axis of the kiln are provided. In travelling through the second section 24 of the kiln the ore is cooled to a temperature of about 700° C. by the cold fuel gas entering through the ring 29, this gas being thereby preheated on its way to the oxidizing burner 38. In the third section 25 of the kiln reducing conditions and a temperature of about 750° C. are maintained by the burner 33 and in passing through this section the ore receives the magnetic roast. On reaching the lower end of the kiln 9, the ore passes through the annular gap between the burner 33 and the wall of the kiln, its passage being again assisted by inclined vanes, and is discharged through the passage 41, in which it cools to below 700° C., into the cooling kiln 12. In travelling through this kiln, the ore is cooled to a temperature of below 150° C. by the current of air drawn through that kiln by the pump 39, the air being thereby preheated to a temperature of about 500° C. on its way to the oxidizing burner 38.

The results which may be obtained by the practice of the invention are illustrated by the following experimental results. Crude iron ore containing about 23% iron, 24% lime (calculated as CaO) in combined form and 0.25% sulphur was first roasted in an oxidizing atmosphere at a temperature of 920° C. and subsequently roasted in a controlled, slightly reducing atmosphere at a temperature of 750° C. and allowed to cool in air. The product was divided magnetically into a concentrate, forming about 65% of the whole, and tailings, forming about 35% of the whole. The concentrate had an iron content of approximately 41%, the iron recovery being about 90%, and a sulphur content of about 0.09%. The tailings contained approximately 42% free lime and had a total lime content of about 64%. These results were obtained not with the apparatus of Figures 1 to 4 but by the use of the pilot scale plant for the magnetic roasting of iron described by L. Reeve in The Journal of the Iron and Steel Institute, 1948, No. II, vol. 159, pages 275–280. The ore was passed twice through the same kiln, which was first operated to effect the calcining roast and then operated to effect the reducing roast. The use of a special kiln, such as that shown in Figures 1 to 4, in which the two roasts are carried out successively during a single passage of the ore through the kiln has the advantages of (a) reduced thermal requirements, and (b) less tendency for loss of free lime by recombination with $CO_2$ in the magnetic roast. Laboratory experiments indicate that the free lime under these conditions would attain 50% or more.

Instead of carrying out the roasting operation in a rotary kiln, stationary vertical towers may be used divided into appropriate preheating, oxidizing, reducing and cooling zones, the ore being fed into the top and discharging at the bottom. The size of ore fed to such a tower is preferably less than ¾ inch, but if desired may be as fine as minus 1/10 inch or less, in which case the gas velocity through the different sections of the tower can be adjusted so as to maintain the ore in a turbulent state, each section comprising a separate bed of ore, the beds being fed from the top and discharged to the next underlying bed by means of suitably disposed pipes. Such "fluidized beds" of solid particles are highly reactive and allow the reactions described above to be completed more rapidly than is the case if relatively large lumps of ore are employed in a rotary kiln. Two forms of such stationary vertical towers employing fluidized beds of ore particles are shown by way of example, in Figures 5 and 6 of the drawings.

The apparatus of Figure 5 comprises a shell 45 having an ore inlet 46 at its upper end and an ore outlet 47 at its lower end. Extending across the interior of the shell are four perforated diaphragms 48 of metal or refractory material which support respectively four beds of ore particles 49, 50, 51, 52. Air is supplied through pipe 53 to below the lowest diaphragm 48 and passes upwardly through ore bed 52. It is prevented from rising through the next diaphragm 48 and entering bed 51 by a solid diaphragm 54 and instead passes through a thermally insulated pipe 55 into bed 50. Fuel gas is supplied through pipe 56 to a point immediately above solid diaphragm 54 and also to ore bed 50, the relative distribution of gas being controlled by valves 57, 58. The gaseous fluid rising through each of the diaphragms 48 has sufficient velocity to maintain the bed of ore supported upon that diaphragm in a fluidized state. Waste gas finally leaves the shell through an outlet 59.

The finely divided limey ore entering the tower through inlet 46 is first received in the bed 49 where it is preheated by the hot products of combustion rising from bed 50. Heated ore from bed 49 overflows through pipe 60 into bed 50 where the fuel gas rising from bed 51 together with additional gas admitted through valve 58 is burnt in the preheated air admitted through pipe 55 and the ore is roasted under oxidizing conditions at a temperature somewhat above 900° C. to calcine the lime content of the ore. The calcined ore from bed 50 overflows through pipe 61 into bed 51 where it cools in the reducing atmosphere afforded by the fuel gas admitted through valve 57 to a temperature below 750° C. and in so doing preheats the fuel gas rising through the bed and passing to bed 50. The partially cooled ore from bed 51 overflows through pipe 62 into bed 52 where it is further cooled by the air entering through pipe 53 and in so doing preheats this air on its way to bed 50. Finally the ore overflows through pipe 63 to the outlet 47 and thence passes to the magnetic separating plant.

It will be appreciated that the treatment received by the ore in the apparatus of Figure 5 is precisely the same as that which it receives in the kilns 9 and 12 of the apparatus of Figures 1 to 4. Figure 6 shows a modified form of the apparatus of Figure 5 in which the final cooling of the ore is carried out in gas instead of in air so that no reoxidation of the iron oxide takes place. In this form of the apparatus only three instead of four fluidized beds of ore are maintained. The two upper beds 49, 50 function precisely as described with reference to Figure 5. The ore overflowing through pipe 61 passes to the third bed 64 where it is cooled to below reoxidation temperature in the reducing atmosphere provided by the fuel gas admitted through valve 57. Air inlet pipe 53 is connected direct to ore bed 50. Ore bed 64 is shown as being of reduced diameter, in order that the velocity of the gas rising through it may be sufficient to maintain the bed in fluidized condition. Similarly the diameters of the other fluidized beds in the apparatus of both Figures 5 and 6 may be adjusted to maintain suitable gas velocities in each bed.

The apparatus of Figures 1 to 4 may be modified in a way analogous to that in which the apparatus of Figure 5 is shown modified in Figure 6 so that here too final cooling of the ore will be effected in gas instead of in air. Many other modifications of the apparatus are also possible. For example, in the apparatus of Figures 1 to 4 cooling of the ore may be effected in an integral extension of the main kiln 9, instead of in a separate kiln 12. In the apparatus of Figures 5 and 6 some or all of the beds may be duplicated to ensure sufficient time of contact between gas and ore for the completion of the required chemical reaction and to give adequate heat transfer.

What is claimed is:

1. A process for the concentration of iron ore containing lime in the form of the carbonate in an amount of about 24% lime (calculated as CaO) in which the ore is first roasted in an oxidizing atmosphere at a temperature between about 900° C. and 1050° C. so as to cause the production of free lime from the lime content of the ore without causing the lime to combine with the iron, thereafter roasted in a reducing atmosphere at a lower temperature to convert the iron sesquioxide to ferroso-ferric oxide and maintained in a reducing atmosphere at least until its temperature has fallen to 700° C. and thereafter divided magnetically into a concentrate relatively enriched in percentage of iron and containing the greater part of the iron and tailings which contain a substantial proportion of free lime.

2. A process in accordance with claim 1 in which the reducing atmosphere for the magnetic roast of the ore is afforded by fuel gas which is subsequently burnt to effect the preliminary oxidizing roast of fresh supplies of ore.

3. A process in accordance with claim 1 in which the ore is cooled after having been subjected to the magnetic roast by a stream of air which is thereby heated and is subsequently employed to effect the oxidizing roast of fresh supplies of ore.

4. A process in accordance with claim 1 in which the ore is cooled in a reducing atmosphere to below the temperature at which reoxidation of the iron oxide would take place.

5. A process in accordance with claim 1 in which the ore is treated in finely divided form and passes successively through a number of beds, in each of which it is maintained in fluidized condition by the gaseous fluid with which it is being treated.

LEWIS REEVE.

References Cited in the file of this patent

UNITED STATES PATENTS

| Number | Name | Date |
|---|---|---|
| Re. 12,856 | Moore et al. | Sept. 22, 1908 |
| 68,561 | Goodwin et al. | Sept. 3, 1867 |
| 1,684,958 | Hyde | Sept. 18, 1928 |
| 1,929,713 | Queneau | Oct. 10, 1933 |
| 2,199,654 | Simpson | May 7, 1940 |
| 2,293,939 | Fahrenwald | Aug. 25, 1942 |
| 2,455,092 | Ramseyer et al. | Nov. 30, 1948 |
| 2,477,454 | Heath | July 26, 1949 |
| 2,495,225 | Buehl et al. | Jan. 24, 1950 |